United States Patent [19]

Pust

[11] 4,294,180

[45] Oct. 13, 1981

[54] GRAIN DRILL WITH DEVICE FOR PREVENTING UNDESIRED BACKFILLING OF FRONT FURROW BY REAR FURROW OPENERS

[76] Inventor: Waldo H. Pust, Savage, Mont. 59262

[21] Appl. No.: 89,911

[22] Filed: Oct. 31, 1979

[51] Int. Cl.³ .............................................. A01C 5/00
[52] U.S. Cl. ...................................... 111/52; 111/85;
    172/176; 172/510
[58] Field of Search .............. 172/176, 538, 539, 508,
    172/509, 510, 513, 149–151, 157, 182, 1, 512,
    517; 111/52, 85, 87, 88, 53–60, 62, 65, 66, 69,
    81, 83, 84, 86, 1

[56] References Cited

U.S. PATENT DOCUMENTS

| | | | |
|---|---|---|---|
| 428,002 | 5/1890 | Kirkpatrick | 111/84 |
| 1,008,925 | 11/1911 | Pribil | 111/59 |
| 1,084,307 | 1/1914 | Altgelt | 111/88 X |
| 1,824,233 | 9/1931 | Rector | 172/149 |
| 1,901,299 | 3/1933 | Johnson | 172/538 X |
| 1,902,924 | 3/1933 | Wamhoff et al. | 111/52 X |
| 2,433,199 | 12/1947 | Carter | 172/510 |
| 2,755,751 | 7/1956 | Beilke | 111/85 X |
| 3,117,541 | 1/1964 | Todd et al. | 172/176 X |
| 3,177,830 | 4/1965 | Zimmerman | 172/176 X |
| 3,623,439 | 11/1979 | Hair | 111/85 |

Primary Examiner—James R. Feyrer
Attorney, Agent, or Firm—Peterson, Palmatier, Sturm & Sjoquist

[57] ABSTRACT

Forwardly disposed furrow openers and rearwardly disposed furrow openers are conventionally offset to one side of the path traversed by the forwardly disposed furrow openers. To prevent partial backfilling of the furrows formed by the front openers when the grain drill on which the openers are mounted is pulled at relatively high speeds, a device including a pair of downwardly converging wheels is provided, the wheels being rotatably mounted on the angled end portions of an axle or shaft. The straight central portion of the shaft is firmly clamped in a sleeve at the rear end of an arm which has its forward end clamped to the rear end of a strut pivotally attached to the grain drill. The central straight portion of the shaft can be rotated so as to obtain the best operation of the wheels. In this way, soil that would be plowed into the furrows formed by the forwardly disposed furrow opener is resisted by the circular wheels. Consequently, all of the furrows remain open even at high speeds, and no extra dirt is thrown into the front furrow which would causes the seed therein to be too deep with the consequence that the seed may not emerge.

12 Claims, 6 Drawing Figures

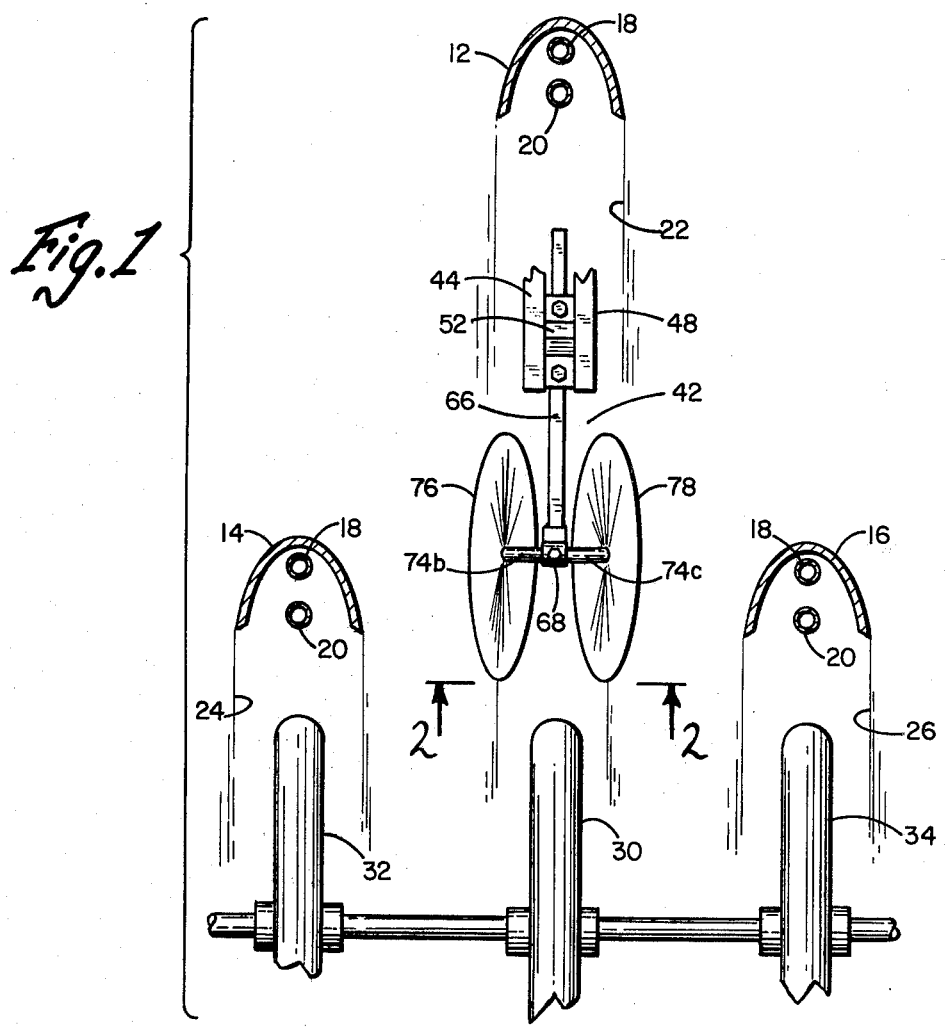
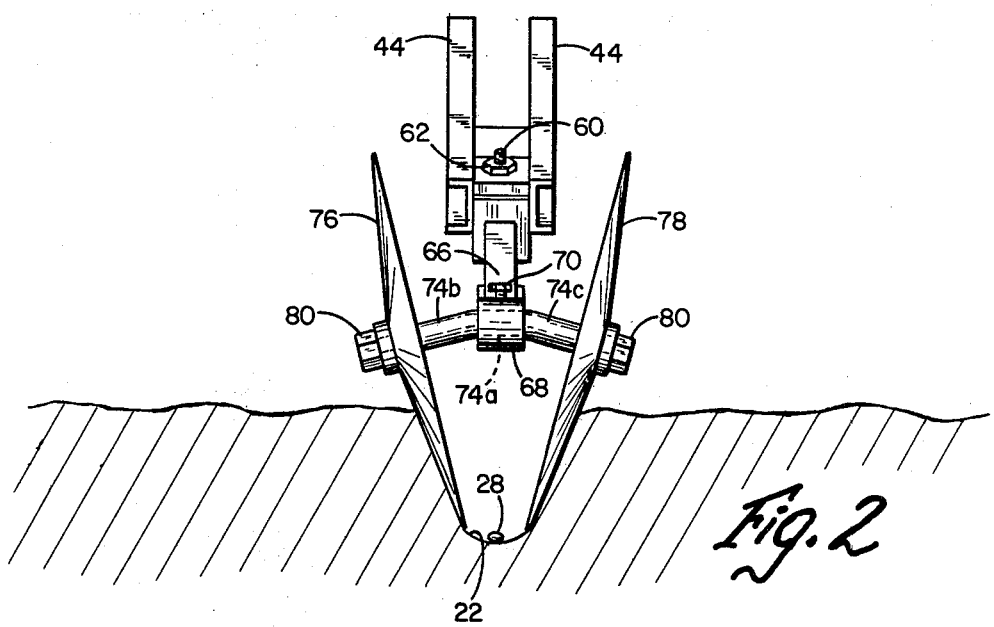

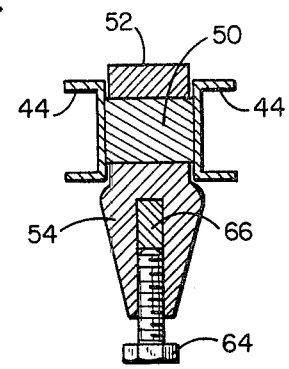
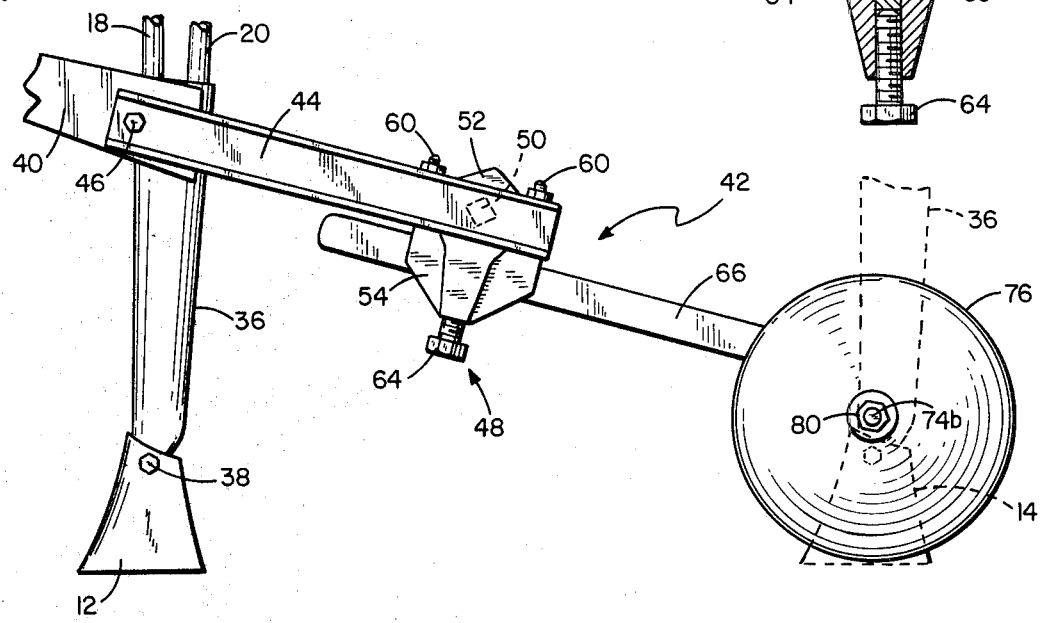
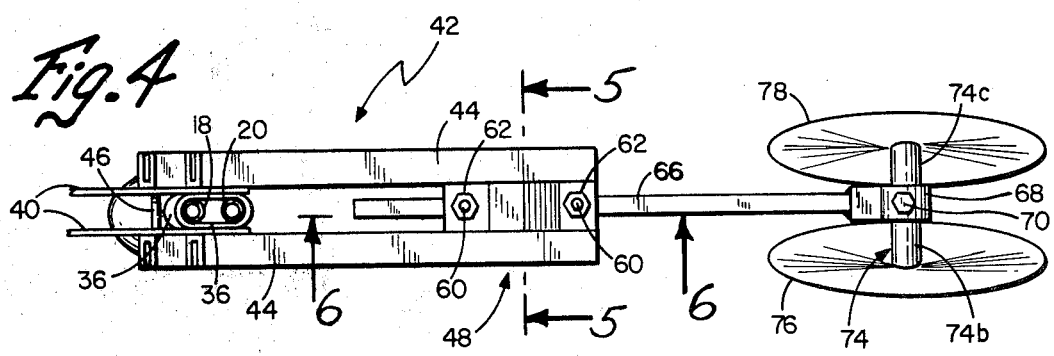
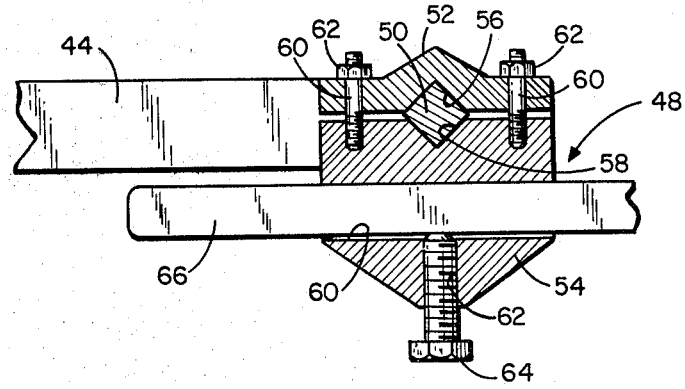

GRAIN DRILL WITH DEVICE FOR PREVENTING UNDESIRED BACKFILLING OF FRONT FURROW BY REAR FURROW OPENERS

BACKGROUND OF THE INVENTION

1. Field of the Invention

This invention relates generally to grain drills, and pertains more particularly to a grain drill for planting small grain.

2. Description of the Prior Art

Grain drills vary in their constructions from manufacturer to manufacturer. Basically, though, grain drills include a plurality or gang of furrow openers. Larger grain drills include a gang of forwardly disposed furrow openers and a gang of rearwardly disposed furrow openers, the rearwardly disposed openers being in an offset or staggered relationship to the forwardly disposed openers. The number of furrow openers will vary appreciably and to some degree the spacing of each with respect to the other. Unfortunately, when the forwardly disposed furrow openers form their furrows, the rearwardly disposed furrow openers will produce a partial backfilling of the furrows formed by the forwardly disposed openers. As far as I am aware, the prior art has tolerated this condition, even though it results in the front furrows being partially covered by rear furrow openers, thereby causing too much dirt to be moved into the front furrows with the result that the seed is too deep; such a condition will produce a poor stand of grain. Because of this adverse result, grain drills of the furrow type have had to be operated very slowly to minimize as much as possible the objectionable backfilling. Even then, it has not always been entirely possible to avoid the above-alluded to excessive covering.

SUMMARY OF THE INVENTION

Accordingly, one object of my invention is to prevent or minimize the unwanted backfilling of furrouws already formed by forwardly disposed furrow openers. More specifically, an aim of the invention is to employ circular wheels that prevent the sides of the furrows formed by the forwardly disposed furrow openers from being partially filled from the plowing action stemming from the rearwardly disposed furrow openers that are forming furrows in between the already formed furrows resulting from the gang of forwardly disposed openers. In this way, the seed deposited via the seed tubes associated with the front furrow openers will not be covered too deeply, a situation interfering with the emergence of the plant after the seed germinates.

Another object, which flows from the above object, is to reduce the time required to seed a given area. It is to be noted that speed is very important at seeding time, and when practicing the teachings of my invention, the grain drill can be moved across the field at speeds on the order of six miles per hour without being concerned about overcovering any of the seed.

Another object of the invention is to permit an adjustment of the converging circular wheels that prevent the unwanted partial backfilling so that irrespective of the furrow depth the furrows can be properly kept open without covering the seed planted by the front furrow openers.

Also, the invention has for an object the mounting of the converging wheels so that they are free to move up and down.

A further object of my invention resides in the simplicity of the device for assuring that the furrows formed by the forwardly disposed openers will be kept sufficiently open to keep the seed from being covered too deeply.

Yet another object of the invention is to provide a device of the foregoing character which can be installed on grain drills already in existence. In this regard, the invention not only permits an easy attachment of my device, but provision is made for longitudinal adjustment in a fore and aft direction so that the inclined wheels may be located in the best possible relation with the rearwardly located furrow openers.

Briefly, my invention contemplates the use of any preferred number of canted or downwardly converging circular wheels located laterally abreast of the rearwardly disposed furrow openers so that the lower segmental portions of the wheels prevent dirt being thrown by the rear furrow openers from partially covering the furrows formed by the forwardly disposed furrow openers. By mounting the wheels on the angled end portions of a shaft having a straight central portion, the shaft can be twisted or rotated with respect to the sleeve in which it is mounted so as to raise or lower the wheels to whatever degree is needed in order to prevent the partial backfilling of the furrows resulting from the action of the forwardly ganged openers and at the same time change their degree of convergence. Also, the wheels can move up or down in the furrow.

BRIEF DESCRIPTION OF THE DRAWINGS

FIG. 1 is a horizontal sectional view of a fragmentarily depicted grain drill taken generally in the direction of line 1—1 of FIG. 3, the view including two rearwardly disposed furrow openers in addition to the forwardly disposed opener appearing in FIG. 3;

FIG. 2 is a rear elevational view of the wheels illustrated in FIG. 1, the view looking forwardly in the direction of line 2—2 in order to show their downward convergence;

FIG. 3 is a side elevational view of a forwardly disposed opener typically employed with conventional grain drills with my converging wheels mounted in a trailing relation therewith;

FIG. 4 is a top plan view corresponding to FIG. 3, and

FIG. 5 is a sectional detail taken in the direction of line 5—5 of FIG. 4, and

FIG. 6 is a sectional detail taken in the direction of line 6—6 of FIG. 4.

DESCRIPTION OF THE PREFERRED EMBODIMENT

Inasmuch as grain drills with which my invention will find utility are susceptible to construction variation, the precise design not being critical as far as the practicing of my invention, no need to show a grain drill exists, or even a substantial portion of one. Usually, a grain drill includes a box frame having a tractor hitch extending forwardly therefrom, the frame being supported on a pair of ground engaging wheels to render it mobile. In addition, a typical grain drill has a plurality or gang of forwardly disposed furrow openers which are mounted or supported on a tool bar carried by the frame. Still further, a gang of rearwardly disposed furrow openers is supported on a rearwardly located tool bar. It should be noted that the rearwardly disposed furrow openers are laterally offset or staggered with respect to the forwardly disposed furrow openers. The furrow openers can be of the hoe, shoe, or disc type. In other words, the particular type of furrow opener is not of great import as far as the practicing of my invention is concerned, although the invention is best suited for use with hoe-type furrow openers.

Surmounted on the box frame of the usual grain drill is an elongated seed hopper or grain box in which the seeds to be planted are stored. Frequently, a fertilizer box, commonly a second compartment in the same box containing the seeds, is also carried on the drill. Seed tubes extend downwardly at laterally spaced locations from the bottom of the grain box so as to deposit seed in each of the furrows formed by the forwardly disposed openers, the same holding true for the rearwardly disposed openers. Likewise, fertilizer tubes extend downwardly from the fertilizer box.

As already mentioned, gangs of furrow openers are mounted on a typical grain drill, perhaps as many as 27 or so. However, as the description progresses, it will become obvious that a complete grain drill need not be shown and that only three openers need be shown in order to provide a ready understanding and appreciation of the manner in which my invention functions and the benefits to be derived therefrom. With this in mind, from FIG. 1 it will be perceived that parts of a conventional grain drill have been illustrated with my invention embodied therein. In this regard, a single forwardly disposed opener 12 of the hoe-type appears sectionally in FIG. 1 and in elevation in FIG. 3. In practice, this is but one of a gang of such openers, as herein already explained. A pair of rearwardly disposed hoe-type openers 14 and 16 have also been sectionally shown in FIG. 1. It will be clearer, it is believed, to show only a single rear opener 14 (or 16) in FIG. 3, doing so in phantom or dotted outline in order not to obscure my invention. Once again, it will be understood that the two openers 14, 16 are but two of a plurality or gang of such openers.

The seed tubes, there being one for each opener 12, 14 and 16, have been labeled 18 and extend down from the previously mentioned seed box (not shown). In like manner, the fertilizer tubes, also one per opener, have been denoted by the reference numeral 20.

It will be recognized from the description so far that the several openers 12, 14 and 16 each form a furrow as the drill is advanced over a field to be planted. The furrow formed by the forward opener 12 has been labeled 22, and the furrows formed by the rear openers 14 and 16 have been indicated by the reference numerals 24 and 26, respectively.

After the seeds, which have been denoted by the reference numeral 28, have been deposited in the furrows via the seed tubes 18, then the seeds 28 must be covered. Various types of covering devices have been employed on grain drills of the type now being described, such as drag chains, drag bars and scraper blades. For the sake of completeness, rubber-tired press-wheels 30, 32 and 34 have been illustrated.

From FIG. 3, it can be observed that the forward hoe-type opener 12 is attached to the lower end of a rigid boot 36 by means of a bolt 38. The upper end of the boot 36 is secured to the rear ends of a pair of downwardly sloping arms 40, which are part of the grain drill and the forward ends of which are welded to the drill's frame (not shown).

The description up to this point has dealt with conventional constructions of grain drills, although various refinements have been omitted for the sake of drafting simplicity.

My invention effectively prevents the unwanted partial backfilling of the furrow 22 formed by the forwardly disposed opener 12. My device for achieving this goal has been indicated generally by the reference numeral 42. More specifically, strut means composed of a pair of channels 44 are pivotally connected to the upper end of the rigid boot 36 by means of a bolt 46. The strut means or channels 44 slope downwardly from the boot 36 and have secured to their lower ends a V-grip clamp 48 comprising a short transverse square bar 50 having its ends welded to the webs of the channels 44. A pair of blocks 52 and 54 having angled notches 56 and 58, respectively, are clamped to the bar 50 by threaded studs 60 and nuts 62. The lower block 54 has a rectangular passage or bore 60 extending therethrough. A tapped hole 62 permits a clamping bolt 64 to be employed for a purpose now to be explained.

Continuing with the overall description of the device 42, it further includes a tongue or arm 66 having a rectangular cross section corresponding to that of the bore 60. It is the bolt 64 that retains the arm 66 in a longitudinally adjusted position, the reason for which will presently be explained.

The rear end of the arm 66 has welded thereto a bushing or sleeve 68. A set screw 70 extends radially into the sleeve 68.

The bushing or sleeve 68 supports a shaft or axle 74. In this regard, the shaft or axle 74 has a straight central portion 74a received within the sleeve 72 and which is prevented from rotating by means of the set screw 70. The shaft 74 includes angled end portions 74b and 74c.

Rotatably journaled on the angled end portions 74b, 74c are circular discs or generally flat wheels 76 and 78. By reason of the angled end portions 74b, 74c a downward convergence is imparted to the wheels 76, 78 as perhaps best understood from FIG. 2. Although various ways can be resorted to for holding the discs or wheels 76, 78 in a desired, spaced relationship, for the sake of simplicity nuts 80 have been shown.

Because of the inclined or angled configuration of the end portions 74b, 74c with respect to the central or straight portion 74a, by rotating or twisting the central portion within the sleeve 68, which can be readily done after the set screw 70 has been loosened, their degree of downward convergence can be altered or changed, the discs or wheels 76 and 78 at the same time being raised or lowered. Such an adjustment will also affect the toeing in of the discs or wheels 76, 78. It can be explained that one would usually have the angled portions 74b, 74c in their six o'clock positions, as depicted, but the adjustment permits a change to be readily made where soil conditions, slope of the furrow sides resulting from the particular type of opener used and the like so dictate. The canted or inclined relationship of the discs or wheels 76, 78 would normally be selected so as to approximate the slope imparted to the sides of the furrow.

Although only one device 42 has been shown and described, it is thought readily apparent how a number of such devices 42 effectively prevent any unwanted or undesired backfilling of the furrows formed by the forwardly disposed openers, such as the furrow 22 formed by the opener 12. However, a brief summation will serve to demonstrate the benefits to be derived from a practicing of my invention. Therefore, it will be recognized that in practice the various furrows are relatively close together, being sometimes only on the order of six inches or so. Depending upon the soil conditons, the furrow openers, such as the openers 24 and 26, disposed rearwardly in performing their plowing action displace soil from the furrows that they form, such as those labeled 24 and 26, and depending upon the soil conditions some of such displaced soil will be forced into the furrows, such as the furrow 22, formed by the forwardly disposed openers, such as the opener 12. However, by reason of the discs or wheels 76, 78 being aligned laterally with respect to the rearwardly disposed openers 14, 16, any tendency for the soil to be pushed in or the sides of the furrow 22 to be caved in will be resisted by the lowermost segmental portions of the canted wheels.

Consequently, the seed 28 in the furrow 22 is not covered by virtue of the rear furrow openers 24 and 26 throwing soil back into the furrow 22 which the forward or front opener 12 has made. The capability of adjusting the tongue or arm 66 forwardly or rearwardly by loosening the bolt 64 plus being able to change the angle between the wheels 76 and 78, permits the very best operation to be obtained. In this regard, the shifting of the arm 66 longitudinally permits the laterally spaced discs or wheels 76, 78 to be moved into a laterally aligned relation with the rear openers 24, 26, whereas the rotation of the central portion 74a of the shaft 74 in the sleeve 68 enables the angle between the discs or wheels 76, 78 to be modified. The pivotal attachment of the strut 44 to the boot 36 permits the discs or wheels 76, 78 to move up and down as they advance along the front furrow 22.

I claim:

1. A method of planting seed comprising the steps of forming a front furrow, depositing seed in said front furrow, concurrently forming a rear furrow offset to one side of said front furrow, said step of forming said rear furrow displacing or shifting soil from said rear furrow in the direction of said front furrow, depositing seed in said rear furrow, preventing the soil displaced or shifted from said rear furrow as it is formed from entering said front furrow by employing disc means for deflecting soil displaced or shifted from said rear furrow, thereby preventing undesired backfilling of said front furrow, and covering the seed in said front furrow with some of the soil forming said front furrow.

2. In a grain drill including a furrow opener in a forwardly disposed gang and first and second furrow openers in a rearwardly disposed gang spaced behind said forwardly disposed opener, said first rearwardly disposed furrow opener being offset to one side of the path traversed by said forwardly disposed furrow opener and said second rearwardly disposed furrow opener being offset to the other side of the path traversed by said forwardly disposed furrow opener, a device comprising disc means rearwardly spaced and aligned with respect to said forwardly disposed furrow opener and laterally spaced and aligned with respect to said first and second rearwardly disposed openers, said disc means being of a size in relation to said forwardly disposed furrow opener so as to engage a bottom portion of the furrow formed by said forwardly disposed furrow opener and also to extend upwardly above the furrow formed by said forwardly disposed furrow opener to a height sufficient to prevent undesired backfilling of the furrow formed by the forwardly disposed opener as the rearwardly disposed openers form their furrows.

3. The combination of claim 1 in which said disc means includes a generally flat surface adjacent each side of the furrow formed by said forwardly disposed opener, said surfaces being in general alignment with said first and second rearwardly disposed furrow openers.

4. The combination of claim 2 in which said said surfaces are at angles conforming generally to the slope of the sides of the furrow formed by said forwardly disposed opener.

5. The combination of claim 1 in which said disc means includes a pair of circular discs, said discs being laterally aligned and laterally spaced with respect to said first and second rearwardly disposed openers, means forwardly disposed in relation to said discs for depositing seed in the furrow formed by said forwardly disposed furrow opener, and pressing means rearwardly disposed in relation to said discs for covering said seed, said discs being laterally spaced with respect to each other so that one of said discs engages the bottom of said furrow formed by said forwardly disposed furrow opener to one side of said seed and the other of said discs engages the bottom of said furrow formed by said forwardly disposed furrow opener to the other side of said seed.

6. The combination of claim 5 in which said circular discs converge downwardly so that their lowermost peripheral segments are closer together than their uppermost segments.

7. A grain drill in accordance with claim 6 including an axle having angled end portions, said circular discs being rotatably journaled on said end portions.

8. A grain drill in accordance with claim 7 in which said axle has a straight central portion and means clamping said central portion to maintain said angled end portions in an adjusted relation.

9. The combination of claim 5 including arm means, said discs being mounted for rotation at one end of said arm means in a downwardly converging relation with each other.

10. The combination of claim 9 including strut means pivotally connected at one end to said grain drill adjacent said forwardly disposed opener and extending rearwardly with respect thereto, and means for adjustably clamping the other end of said arm means to the rear end of said strut means.

11. In a grain drill including a forwardly disposed furrow opener and first and second rearwardly disposed furrow openers, said first rearwardly disposed furrow opener being offset to one side of the path traversed by said forwardly disposed furrow opener and said second rearwardly disposed furrow opener being offset to the other side of the path traversed by said forwardly disposed furrow opener and said grain drill for this including means for depositing seed in the furrow formed by said forwardly disposed furrow opener, a device for preventing undesired backfilling of the furrow formed by said forwardly disposed opener, said device comprising arm means, a sleeve at one end of said arm means, a shaft having angled end portions and a central straight portion received in said sleeve, means releasably clamping said central straight portion in a rotatively adjusted relation in said sleeve, a pair of discs laterally spaced with respect to each other so that one disc passes to one side of said seed and the other disc passes to the other side of said seed, said discs being rotatively mounted on said end portions so that said discs assume a downwardly converging relation with respect to each other, said discs being rearwardly spaced and aligned with respect to said forwardly disposed furrow opener and laterally spaced and aligned with respect to said first and second rearwardly disposed openers for preventing undesired backfilling of the furrow formed by the forwardly disposed opener as the rearwardly disposed openers form their furrows, and a press wheel rearwardly disposed with respect to said discs for covering the seed in said furrow formed by said forwardly disposed furrow opener.

12. The combination of claim 11 including strut means, and means for releasably clamping the other end of said arm means to said strut means.

* * * * *